(12) United States Patent
Davydov et al.

(10) Patent No.: US 7,706,455 B2
(45) Date of Patent: Apr. 27, 2010

(54) MULTICARRIER TRANSMITTER FOR MULTIPLE-INPUT MULTIPLE-OUTPUT COMMUNICATION SYSTEMS AND METHODS FOR PUNCTURING BITS FOR PILOT TONES

(75) Inventors: Alexei V. Davydov, Nizhny Novgorod (RU); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1248 days.

(21) Appl. No.: 11/234,972

(22) Filed: Sep. 26, 2005

(65) Prior Publication Data

US 2007/0071119 A1      Mar. 29, 2007

(51) Int. Cl.
    *H04L 27/28* (2006.01)
(52) U.S. Cl. ................................ 375/260; 375/295
(58) Field of Classification Search ................ 375/260, 375/267, 295
    See application file for complete search history.

(56) References Cited

U.S. PATENT DOCUMENTS

| 6,622,281 | B1 | 9/2003 | Yun et al. | |
|---|---|---|---|---|
| 2004/0068687 | A1 | 4/2004 | Kim et al. | |
| 2004/0146025 | A1* | 7/2004 | Hwang et al. | 370/334 |
| 2004/0160892 | A1* | 8/2004 | Agrawalla et al. | 370/203 |
| 2005/0002326 | A1* | 1/2005 | Ling et al. | 370/208 |
| 2006/0023680 | A1* | 2/2006 | Oh et al. | 370/338 |

FOREIGN PATENT DOCUMENTS

WO     WO-02093779 A2     11/2002

OTHER PUBLICATIONS

Fragouli, C., et al., "Minimality for punctured convolutional codes", *IEEE International Conference on Communications*, New York.US. vol. 1(10), (Jun. 11, 2001),300-304.
Min, G. K., et al., "Quasi- Complementary Turbo Codes(QCTC) For Applications In High-Data-Rate Systems", *The 57th. IEEE Semiannual Vehicular Technology Conference*, vol. 4(4), Proceedings. Jeju,Korea,(Apr. 22, 2003),2381-2385.

* cited by examiner

*Primary Examiner*—Chieh M. Fan
*Assistant Examiner*—Freshteh N Aghdam
(74) *Attorney, Agent, or Firm*—Schwegman, Lundberg & Woessner, P.A.; Gregory J. Gorrie

(57) ABSTRACT

Embodiments of a transmitter and methods for puncturing bits are generally described herein. Other embodiments may be described and claimed. In some embodiments, a multicarrier transmitter performs bit puncturing for pilot subcarriers in two operations. The first operation may uniformly removes bits from an encoded bit stream to achieve a predetermined code rate reserving space for pilot subcarriers of a predetermined number of antennas. The second operation may remove bits from each spatial data stream after interleaving in a manner to achieve approximately equal spacing between the punctured bits before interleaving. In this way, a conventional interleaver may be used. The second operation reserves space for pilot subcarriers when a greater number of antennas than the predetermined number are used.

22 Claims, 3 Drawing Sheets

MULTICARRIER TRANSMITTER FOR MULTIPLE-INPUT MULTIPLE-OUTPUT COMMUNICATION SYSTEMS AND METHODS FOR PUNCTURING BITS FOR PILOT TONES

TECHNICAL FIELD

Some embodiments of the present invention pertain to wireless communication systems. Some embodiments of the present invention pertain to orthogonal frequency division multiplexed (OFDM) communication systems that used two or more transmit antennas.

BACKGROUND

Some multicarrier communication systems, including Worldwide Interoperability for Microwave Access (WiMax) systems, use symbol modulated subcarriers to communicate data through a communication channel. Data is transmitted on data subcarriers and most of the training values are transmitted on pilot subcarriers. The training values in the pilot subcarriers allow a receiver to obtain channel state information and synchronize with the transmissions. In some communication systems, the transmitter creates space for pilot subcarriers by puncturing bits at the symbol level before transmission. One problem with puncturing at the symbol level is that the code bits in the punctured symbols are not uniformly distributed at the bit level resulting in an increased packet error rate and reduced receiver performance.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
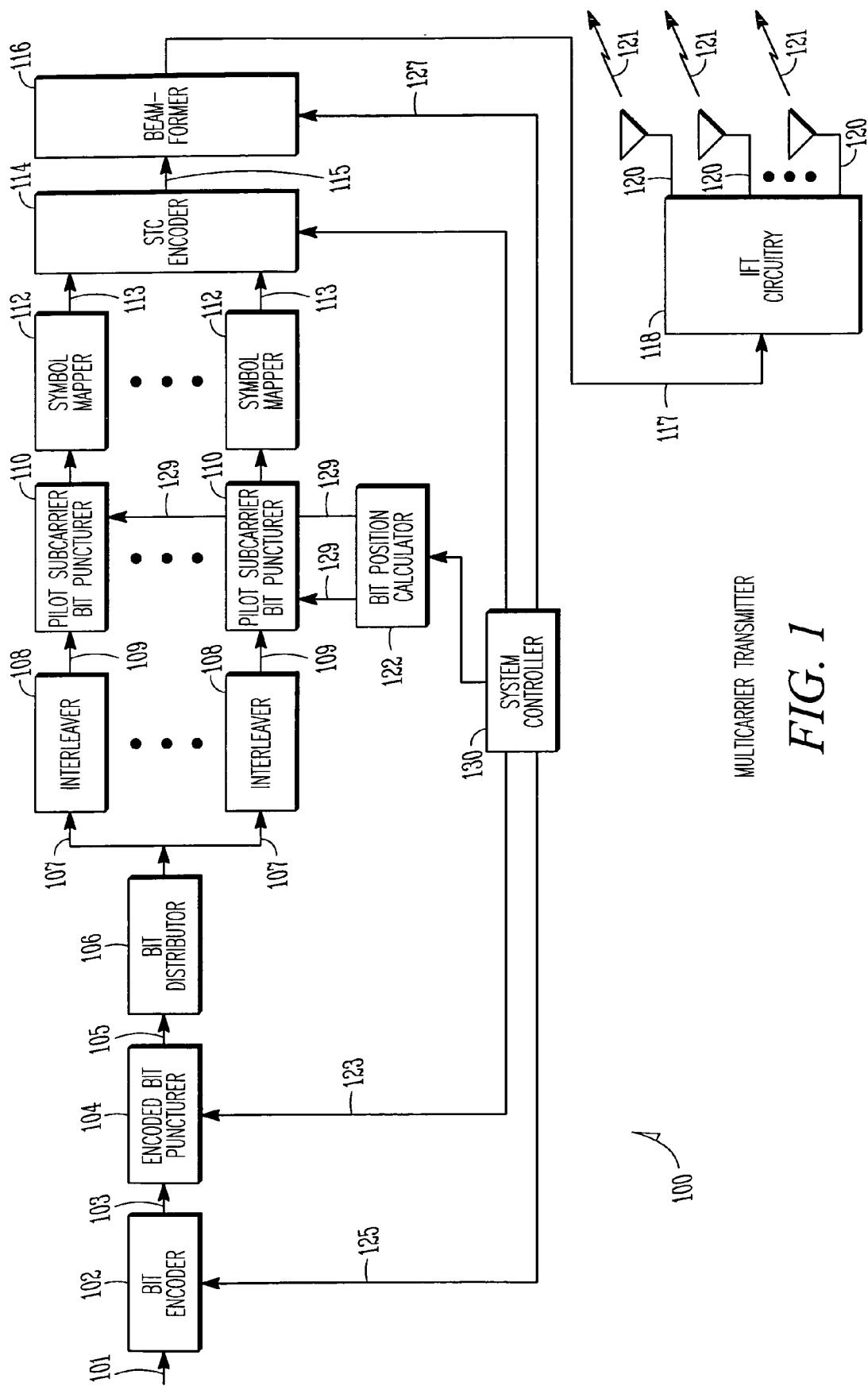
FIG. 1 is a functional block diagram of a multicarrier transmitter in accordance with some embodiments of the present invention.

FIG. 1 is a functional block diagram of a multicarrier transmitter in accordance with some embodiments of the present invention. Multicarrier transmitter 100 may transmit two or more spatial data streams 121 generated from one or more input bit streams 101 and may use two or more transmit antennas 120. In some embodiments, multicarrier communication signals transmitted by multicarrier transmitter 100 include data subcarriers and pilot subcarriers. The data subcarriers include the information and the pilot subcarriers are used for signal acquisition and synchronization, among other things, by the receiver (not shown). In some multiple-input multiple-output (MIMO) embodiments, separate pilot subcarriers are transmitted by each transmit antenna 120 to allow the transmissions from each antenna to be separated at the receiver. In some other embodiments, the pilot subcarriers are sent by each beamformed spatial channel to allow transmissions from each beamformed spatial channel to be received correctly. In some embodiments, the pilot subcarriers used by each antenna may be orthogonal (e.g., use a different frequency subcarrier) while the data subcarriers may be non-orthogonal in frequency. In these MIMO embodiments, the system may take advantage of the spatial diversity of the transmit antennas to allow for the transmission of different data streams on the same subcarriers.

In accordance with some embodiments, multicarrier transmitter 100 removes bits from an encoded bit stream to make room for the pilot subcarriers. In some embodiments, multicarrier transmitter 100 performs bit puncturing for the pilot subcarriers in two operations. The first operation may remove bits from an encoded bit stream to achieve a predetermined code rate reserving space for pilot subcarriers of a predetermined number (e.g., two) of antennas 120. The second operation may remove bits from each spatial data stream after interleaving in a manner to achieve approximately equal spacing between the punctured bits before interleaving. In this way, a conventional interleaver may be used. In some embodiments, the second operation reserves space for pilot subcarriers when a greater number of antennas than the predetermined number is used. These embodiments are discussed in more detail below.

Multicarrier transmitter 100 includes bit encoder 102 to encode bits of input bit stream 101 and encoded bit puncturer 104 to remove bits from encoded bit stream 103. In some embodiments, multicarrier transmitter 100 may also include bit distributor 106 to distribute bits among several spatial data streams. Multicarrier transmitter 100 also includes interleavers 108 to perform interleaving operations on blocks of encoded bits 107, pilot subcarrier bit puncturers 110 to remove additional bits, and symbol mappers 112 to map groups of bits to symbols for each spatial data stream. In some embodiments, multicarrier transmitter 100 may also include space-time code (STC) encoder 114 and beamformer 116. Multicarrier transmitter 100 also includes inverse Fourier transform (IFT) circuitry 118 and other circuitry to generate time-domain radio-frequency (RF) signals for transmission by antennas 120. The operations of these elements are described in more detail below.

In some conventional communication systems, such as systems that may operate in accordance with particular wireless communication standards referenced below, pilot subcarriers may be reserved for the first two transmit antennas. For transmitters with more antennas, data symbols on some of the subcarriers are punctured (i.e., removed) to make room for the pilot symbols of the additional antennas (e.g., replacing the original data symbols with pilot symbols). This puncturing at the symbol level causes error floors in packet error rate (PER) curves for convolutional codes because the performance of convolutional codes is dominated by the minimum distance between a valid non-zero codeword (i.e., a trellis) and the zero codeword. The minimum distance is the number of non-zero codebits on the trellis. If the puncturing is denser in one segment than another in the trellis, the PER may be dominated by the minimum distance in the segment with denser puncturing. Some embodiments of the present invention may achieve more uniform puncturing within the encoded bits to help overcome the poor PER performance of these conventional systems.

In accordance with some embodiments of the present invention, pilot subcarrier bit puncturers 110 may selectively remove bits from blocks of interleaved bits 109 in a fashion to achieve approximately equal spacing between the removed bits in the coded blocks of bits 107 prior to interleaving. Symbol mappers 112 may map groups of bits received from bit puncturers 110 to data symbols of subcarriers of a multicarrier communication signal and may refrain from mapping groups of bits to pilot subcarriers of the multicarrier communication signal. In other works, the pilot subcarriers are skipped.

In these embodiments, the result of the operation of pilot subcarrier bit puncturers 110 is that the punctured bits are uniformly removed from encoded bit stream 103 making room for the necessary pilot subcarriers. In these embodiments, pilot subcarrier bit puncturer 110 does not necessarily delete bits uniformly in the order it receives them from interleaver 108, but pilot subcarrier bit puncturer 110 deletes bits in a manner that is uniform in the order that the bits were in at the input to interleaver 108. This is explained in more detail below.

In some embodiments, transmitter 100 may use a conventional encoded bit puncturer for encoded bit puncturer 104 and may use conventional interleavers for interleavers 108 without changing their operations. In this way, pilot subcarrier bit puncturers 110 of transmitter 100 may perform additional puncturing (i.e., remove additional bits) without changing the operations of an existing puncturer and interleaver. Although the punctured bits are not transmitted, errors at the receiver do not significantly increase and, in some cases, may not increase at all, because the punctured bits are more evenly distributed in encoded bit stream 103. Furthermore, the redundant information in the remaining encoded bits may be sufficient for the receiver to recover the information bits.

In some embodiments, encoded bit puncturer 104 removes a number of bits from encoded bit stream 103 to reserve space for pilot subcarriers for a predetermined number (e.g., two) transmit antennas. In some embodiments, the bits removed by encoded bit puncturer 104 may be removed in a non-uniform fashion, although the scope of the invention is not limited in this respect. Pilot subcarrier bit puncturers 110 selectively remove bits from blocks of interleaved bits 109 of each spatial data stream to reserve space for pilot subcarriers for additional transmit antennas (e.g., transmit antennas greater than two). Pilot subcarrier bit puncturers 110 may refrain from removing bits from the blocks of interleaved bits 109 for pilot subcarriers when the predetermined number of transmit antennas are used.

Although some embodiments of the present invention are described in which encoded bit puncturer 104 removes bits for two antennas 120, the scope of the invention is not limited in this respect. In other embodiments, encoded bit puncturer 104 may remove bits to make room for the pilot subcarriers on three or more antennas 120.

As illustrated, multicarrier transmitter 100 may perform two puncturing operations. The first puncturing operation is performed by encoded bit puncturer 104 to achieve a predetermined or specified code rate. In some embodiments, this first puncturing operation may create enough space in the coded bits for pilot subcarriers for two of transmit antennas 120. The second puncturing operation may be performed by pilot subcarrier bit puncturers 110 to create space for the pilot symbols when more than two transmit antennas 120 are used. The overall punctured bits after both puncturing operations may be substantially uniformly distributed in the original un-punctured bit block (i.e., of encoded bit stream 103). In some embodiments, the first puncturing operation and the subsequent interleaving may be performed in accordance with particular wireless communication standards referenced below, although the scope of the invention is not limited in this respect. In some embodiments, the punctured bit locations in the original un-punctured block during the second puncturing operation may take into account the punctured bit locations of the first puncturing operation, which may not be uniform, so that the overall punctured bits are distributed substantially uniformly across in the original un-punctured and un-interleaved blocks (i.e., of encoded bit stream 103). Although the above example describes two puncturing operations, the methods and apparatus described herein may include additional or fewer puncturing operations.

In some embodiments, bit encoder 102 may be a forward error correcting (FEC) encoder and may add forward-error correcting code bits to input bit stream 101 based on initial FEC code rate 125 to generate FEC encoded blocks of encoded bit stream 103. Encoded bit puncturer 104 may puncture (i.e., remove) bits of encoded bit stream 103 to achieve target code rate 123. The target code rate 123 may be selected to reserve space for pilot subcarriers required for a predetermined number (e.g., two) of transmit antennas 120. For example, if initial code rate 125 is ½ (i.e., one information bit in and two coded bits out) and target code rate 123 is ¾, then encoded bit puncturer 104 may remove ⅓ of the bits from its input (e.g., removing every third bit).

In some embodiments, encoded bit puncturer 104 may remove bits reserving enough space for the pilot subcarrier for a predetermined number of antennas. In some embodiments, the predetermined number may be two, although a greater number of antennas may be selected. In these embodiments, target code rate 123 may be selected to reserve enough space for the pilot subcarrier for the predetermined number of antennas. When more than the predetermined number of antennas is used, pilot subcarrier bit puncturers 110 remove additional bits in the manner described herein. In some embodiments, when only two antennas are used, pilot subcarrier bit puncturers 110 may refrain from removing any bits, although the scope of the invention is not limited in this respect.

The forward-error correcting code bits added by bit encoder 102 include redundant information used by a receiver to correct errors in transmission. In some embodiments, encoder 102 may be a convolutional encoder, although the scope of the invention is not limited in this respect.

In some embodiments, multicarrier transmitter 100 may include bit position calculator 122 to calculate bit position indices 129 of bits to be removed by pilot subcarrier bit puncturers 110 based on a number of additional pilot carriers for transmission on more than the predetermined number of transmit antennas 120. Bit position indices 129 may correspond to the position of the bit to be punctured after interleaving. In some embodiments, bit position calculator 122 may calculate an index of the punctured bits using the following equation:

$$I_k = \text{interleave}(i_0 + kp) \text{ for } k = 1 \ldots N$$

where the function interleave (i) computes the index of the interleaved bit whose original index is i before interleaving, N is the number of punctured bits, p is the spacing between two adjacent punctured bits before interleaving, and $I_k$ is the index of the kth punctured bit in the interleaved bit sequence. In some embodiments, N may depend on the number of bits in a block of bits to be interleaved and may range, for example, from twelve to seventy-two bytes, depending on the mode of operation, among other things. In some embodiments, the spacing, p, may depend on the number of additional pilot tones for any additional antennas (i.e., greater than the predetermined number) and the number of data subcarriers employed. For example, when fifty-four total subcarriers are employed, two antennas may, for example, employ six subcarriers for pilot subcarriers. When three antennas are employed, eleven total subcarriers may, for example, be used for pilot subcarriers. In these embodiments, encoded bit puncturer 104 may reserve space for the pilot subcarriers for two antennas (e.g., on only six subcarriers not all eleven). In this example, pilot subcarrier bit puncturers 110 may remove bits for the additional five pilot subcarriers. The spacing 'p' (where r=1/p) between bits to be removed by pilot subcarrier bit puncturers 110 may be calculated as follows: r=5/(54−6) =5/48. In this example, 5/48 of the bits of coded blocks of bits 107 may be removed by each of pilot subcarrier bit puncturers 110. In this example, p=48/5=9.6. This means that for this example, the spacing between two adjacent removed bits may sometimes be nine and sometimes be ten, although the scope of the invention is not limited in this respect.

In some embodiments, pilot subcarrier bit puncturers 110 may selectively remove bits based on bit position indices 129 stored within multicarrier transmitter 100. In these embodiments, bit position indices 129 may be pre-calculated based on a number of additional pilot subcarriers required for transmission on more than the predetermined number of transmit antennas 120.

Interleaver 108 may interleave coded blocks of bits 107 and may generate blocks of interleaved bits 109. In some embodiments, interleavers 108 may be block interleavers. In some embodiments, interleavers 108 may be interleavers that perform interleaving operations in accordance with particular wireless communication standards discussed in more detail below, although the scope of the invention is not limited in this respect. In some embodiments, interleavers 108 functionally may input bits into a matrix in a row-by-row fashion and may output bits from the matrix in a column-by-column fashion, although the scope of the invention is not limited in this respect.

In some embodiments, multicarrier transmitter 100 may selectively transmit up to three or more spatial data streams 121 with up to three or more transmit antennas 120. In these embodiments, multicarrier transmitter 100 may include interleaver 108, pilot subcarrier bit puncturer 10 and symbol mapper 112 for each spatial data stream 121.

In some embodiments, bit distributor 106 may distribute coded blocks of bits 107 to interleavers 108 for each of the spatial data streams. In some embodiments, bit distributor 106 may distribute bits in a group-by-group fashion, while in other embodiments; it may distribute bits in a bit-by-bit fashion. In some embodiments, bit distributor 106 distributes bits of encoded blocks 105 to two or more spatial data streams. In some embodiments, the distribution of bits may be uniform if the streams carry the same amount of data, while in other embodiments; the distribution may be uneven if adaptive bit loading is employed across streams. Adaptive bit loading is discussed in more detail below.

In some alternate embodiments, referred to as horizontally encoded MIMO embodiments, a bit distributor is not used. In these embodiments, multicarrier transmitter 100 may include a separate encoder 102 and encoded bit puncturer 104 for each spatial data stream or antenna, in addition to interleaver 108, pilot subcarrier bit puncturer 110, and symbol mapper 112 for each spatial data stream.

In some embodiments, encoded bit puncturer 104 uniformly remove bits from encoded bit stream 103 to reserve space for pilot subcarriers for two of the transmit antennas. In these embodiments, pilot subcarrier bit puncturers 110 may selectively remove bits from the blocks of interleaved bits 109 to reserve space for pilot subcarriers for a third transmit antenna and any additional transmit antennas 120 when more than two transmit antennas 120 are used. In these embodiments, pilot subcarrier bit puncturers 110 may refrain from removing bits from blocks of interleaved bits 109 when only the two transmit antennas are used.

In some embodiments, STC encoder 114 may perform space-time encoding on data symbols 113 provided by symbol mapper 112 for each spatial data stream allowing the number of output data streams 115 to be different than the number of data streams at the input of STC encoder 114. Furthermore, the number of data streams at the input of STC encoder 114 and/or the number of output data streams 115 may be different than the number of transmit antennas 120 being used for transmission. Beamformer 116 may provide a number of output data streams 117 equal to the number of transmit antennas 120 being used for transmission. In some embodiments, the number of data streams at the input of STC encoder 114 may be equal to the number of output data streams 117, although the scope of the invention is not limited in this respect. In some alternate embodiments, the number of spatial data streams may be less than the number of transmit antennas 120. For example, four transmit antennas 120 may be used to transmit one, two, three or four spatial data streams. When the number of spatial data streams is equal to the number of transmit antennas 120 being used, STC encoder 114 may refrain from space-time encoding data symbols 113, although the scope of the invention is not limited in this respect. In this way, multicarrier transmitter 100 may use a predetermined number of transmit antennas (e.g., four) to transmit up to four spatial streams. Although some embodiments of the present invention are described that use four transmit antennas, the scope of the invention is not limited in this respect. In other embodiments, up to ten or more transmit antennas may be used.

Although encoded bit puncturer 104 is described as removing bits to achieve a predetermined code rate to reserve room for pilot subcarriers for two transmit antennas, the scope of the invention is not limited in this respect as encoded bit puncturer 104 may be configured to reserve room for a different number of antennas. In these embodiments, pilot subcarrier bit puncturers 110 may reserve room for additional pilot subcarriers.

In some embodiments, beamformer 116 may apply beamforming weights 127 to frequency domain symbol modulated subcarriers of output data streams 115 provided by STC encoder 114 prior to operation of IFT circuitry 118. In some embodiments, beamformer 116 may be referred to as a MIMO beamformer receiving more than one spatial stream as an input and providing more than one spatial stream as an output. In some embodiments, beamformer 116 may receive four spatial streams, may apply beamforming coefficients to the four spatial streams, and may provide one output spatial stream for each of four transmit antennas 120. In some embodiments, beamformer 116 may apply weights to each subcarrier in the frequency domain allowing each subcarrier frequency transmitted by each transmit antenna 120 to be weighted. In some embodiments, the weights may be based on channel estimates provided by a receiving station, although the scope of the invention is not limited in this respect. In some embodiments, IFT circuitry 118 may perform inverse discrete Fourier transforms (DFTs) including, for example, inverse fast Fourier transforms (IFFTs).

In some embodiments, spatial data streams 121 transmitted by multicarrier transmitter 100 may be identical (e.g., for redundancy), while in other embodiments, spatial data streams may each carry different data. In horizontally encoded MIMO embodiments, each data stream may have a separate bit encoder and encoded bit puncturer, and bit distributor 106 may not be needed, although the scope of the invention is not limited in this respect.

In some embodiments, symbol mapper 112 may be a quadrature-amplitude modulation (QAM) symbol mapper that may generate QAM symbols from groups of bits based on a modulator level. The various modulation levels that may be employed by symbol mapper 112 are discussed below. In some embodiments, multicarrier transmitter 100 may employ adaptive bit loading allowing a different numbers of bits to be mapped to each symbol based on channel conditions, although the scope of the invention is not limited in this respect. These embodiments are discussed in more detail below.

IFT circuitry 118 and RF transmitter circuitry (not separately illustrated) may generate time-domain signals for each transmit antenna 120 from the data symbols and pilot symbols for transmission by one or more transmit antennas 120. Each transmit antenna may transmit data on the same subcarriers employing spatial diversity. A receiving station receiver may take advantage of this spatial diversity to separate the signals transmitted by each of the transmit antennas to receive two or more data streams.

Figure 2:
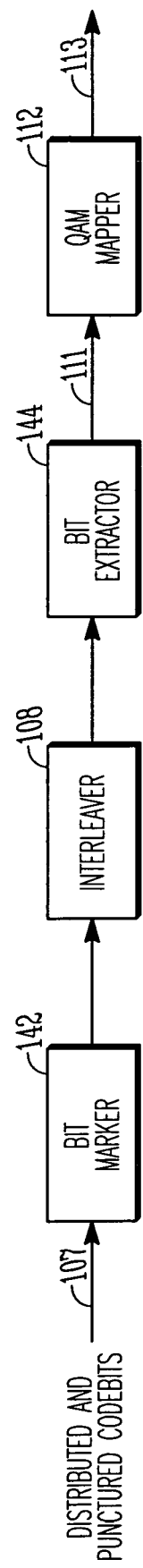
FIG. 2 is a functional block diagram of a portion of a multicarrier transmitter in accordance with some alternate embodiments of the present invention.

FIG. 2 is a functional block diagram of a portion of a multicarrier transmitter in accordance with some alternate embodiments of the present invention. In these embodiments, multicarrier transmitter 100 (FIG. 1) may also include bit marker 142 to mark bits of encoded blocks of bits 107 in a substantially uniform manner. The manner may be substantially uniform prior to interleaving. In these embodiments, pilot subcarrier bit puncturer 110 for each spatial data stream may be replaced with bit extractor 144 to remove the marked bits after interleaving. In some embodiments, bit extractor 144 may remove the marked bits after interleaving based on position indices 129 generated from the marked bits.

In some of these embodiments, marking of bits may be implemented by adding indicator bits prior to interleaving to indicate which bits are to be removed. In these embodiments, interleaving may be performed both on the coded and the indicator bits. After interleaving, the coded bit that has the same position as an indicator bit may be removed.

In some alternate embodiments, initial bit position indices of the marked bits may be provided to interleavers 108, and bit position indices 129 of the marked bits at the output of interleavers 108 may be obtained. In some embodiments, bit position indices 129 may be stored before hand and interleaved blocks 109 may be punctured according to the stored bit position indices 129.

Referring back to FIG. 1, in some embodiments, multicarrier transmitter 100 may be part of a wireless communication device that may transmit orthogonal frequency division multiplexed (OFDM) communication signals. In some embodiments, multicarrier transmitter 100 may transmit over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers, and/or each subcarrier may have an integer number of cycles within a symbol period, although the scope of the invention is not limited in this respect.

In some embodiments, multicarrier transmitter 100 may be part of a wireless access point (AP), such as a Wireless Fidelity (WiFi), Worldwide Interoperability for Microwave Access (WiMax), or broadband communication station, although the scope of the invention is not limited in this respect as multicarrier transmitter 100 may be part of almost any wireless communication device. In some embodiments, multicarrier transmitter 100 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly.

In some embodiments, the frequency spectrums for a multicarrier communication signal may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, multicarrier transmitter 100 may transmit RF communications in accordance with specific communication standards, such as the Institute of Electrical and Electronics Engineers (IEEE) standards including IEEE 802.11(a), 802.11(b), 802.11(g), 802.11(h) and/or 802.11(n) standards for wireless local area networks (WLANs), although multicarrier transmitter 100 may also be suitable to transmit and/or receive communications in accordance with other techniques. In some broadband and WiMax embodiments, multicarrier transmitter 100 may transmit broadband wireless communications in accordance with the IEEE 802.16-2004 standard for wireless metropolitan area networks (WMANs) including variations and evolutions thereof (e.g., IEEE 802.16(e) working group). For more information with respect to IEEE standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some conventional communication systems, such as systems that may operate in accordance with the IEEE 802.16 (d/e) working group/specification, pilot subcarriers may be reserved for the first two transmit antennas. In some embodiments of the present invention, the first puncture operation and the subsequent interleaving may be performed in accordance with the IEEE 802.16(d/e) working group/specification, although the scope of the invention is not limited in this respect. In some embodiments, encoded bit puncturer 104 may perform bit puncturing in accordance with the IEEE 802.16(d/e) working group/specification. In some embodiments, interleavers 108 may perform interleaving operations in accordance the IEEE 802.16(d/e) working group/specification, although the scope of the invention is not limited in this respect.

Antennas 120 may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

In accordance with some embodiments, multicarrier transmitter 100 may symbol-modulate the subcarriers in accordance with individual subcarrier modulation assignments. This may be referred to as adaptive bit loading (ABL). Accordingly, a variable number of bits may be represented by a symbol modulated on a subcarrier. The modulation assignments for the individual subcarrier may be based on the channel characteristics or channel conditions for that subcarrier, although the scope of the invention is not limited in this respect. In some of these embodiments, bit distributor 106 may distribute bits based on the modulation levels employed by symbol mappers 112.

In some ABL embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with higher data communication rates per subcarrier may also be used. In some embodiments, the number of bits per OFDM symbol may vary greatly because of the variable number of bits per symbol-modulated subcarrier, although the scope of the invention is not limited in this respect.

Although multicarrier transmitter 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of multicarrier transmitter 100 illustrated in FIG. 1 may refer to one or more processes operating on one or more processing elements, although the scope of the invention is not limited in this respect.

Figure 3:
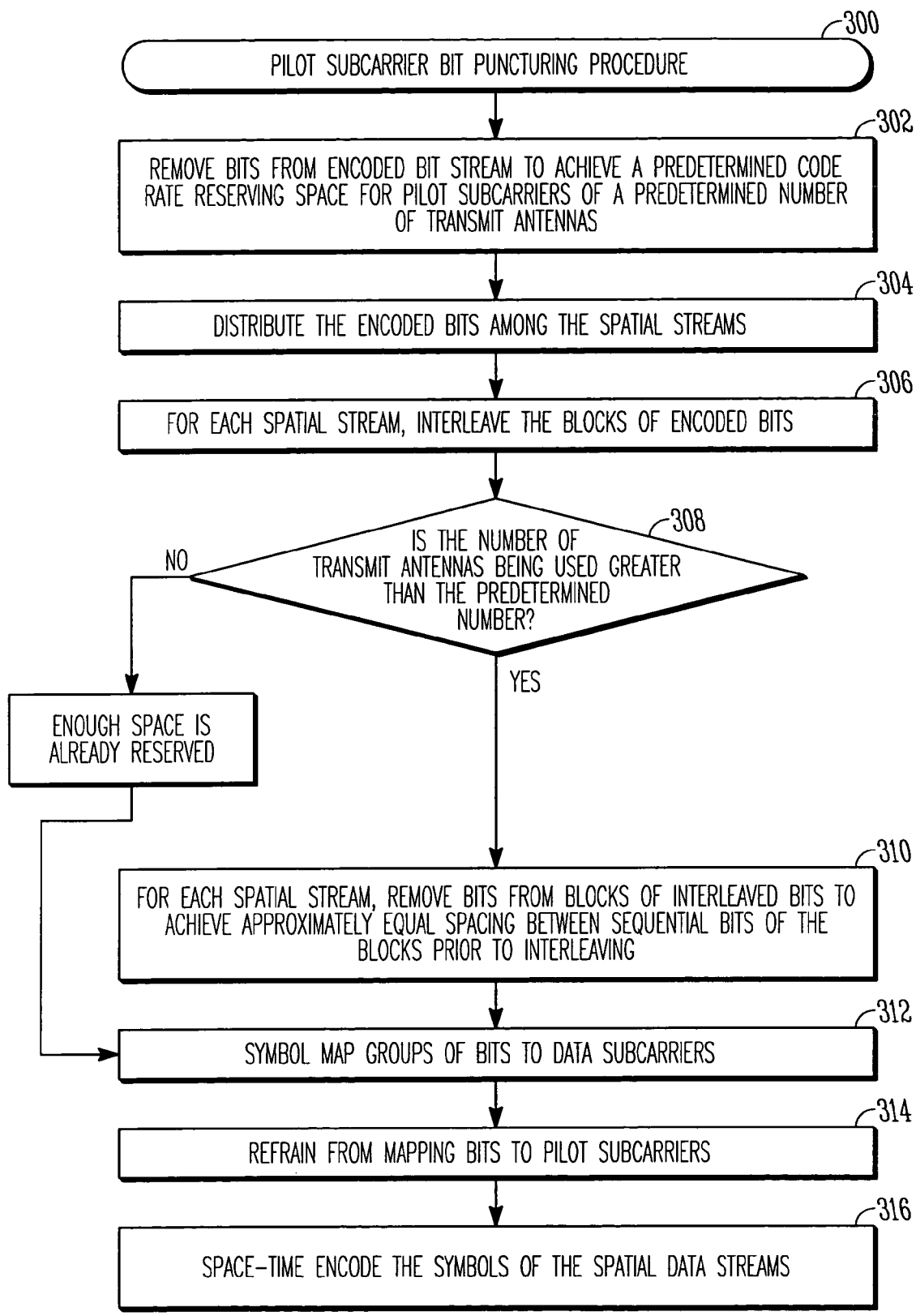
FIG. 3 is a flow chart of a pilot subcarrier bit puncturing procedure in accordance with some embodiments of the present invention.

FIG. 3 is a flow chart of a pilot subcarrier bit puncturing procedure in accordance with some embodiments of the present invention. Pilot subcarrier bit puncturing procedure 300 may be performed by a transmitter, such as multicarrier transmitter 100 (FIG. 1), although other transmitters may also be configured to perform procedure 300. Procedure 300 may achieve a more uniform distribution of punctured bits for the pilot subcarriers, especially when the number of antennas used is greater than the number of antennas that encoded bit puncturer 104 (FIG. 1) removes bits for.

Operation 302 removes bits from an encoded bit stream to achieve a predetermined code rate. This may reserve space for pilot subcarriers of a predetermined number of transmit antennas (e.g., two). Operation 302 may be performed by encoded bit puncturer 104 (FIG. 1), although the scope of the invention is not limited in this respect.

Operation 304 distributes the encoded bits among a plurality of spatial streams. Operation 304 may be performed by bit distributor 106 (FIG. 1), although the scope of the invention is not limited in this respect.

Operation 306 interleaves the blocks of encoded bits for each spatial data stream. Operation 306 may be performed by interleavers 108 (FIG. 1), although the scope of the invention is not limited in this respect.

Operation 308 determines whether additional space needs to be reserved for pilot subcarriers when the number of transmit antennas being used is greater the predetermined number. When additional space needs to be reserved, operation 310 is performed. When enough space was already reserved by operation 302, operation 312 is performed. Operation 308 may be performed by system controller 130 (FIG. 1), although the scope of the invention is not limited in this respect.

Operation 310 removes bits from blocks of interleaved bits to achieve approximately equal spacing in the blocks of bits prior to interleaving in operation 306. Operation 310 may be performed for each spatial data stream and may be performed by pilot subcarrier bit puncturers 110 (FIG. 1), although the scope of the invention is not limited in this respect.

Operation 312 maps groups of bits to data subcarriers for each spatial data stream. Operation 312 may generate symbol-modulated subcarriers for each data subcarrier and for each spatial data stream.

Operation 314 refrains from mapping groups of bits to pilot subcarriers. Operations 312 and 314 may be performed by symbol mappers 112 (FIG. 1), although the scope of the invention is not limited in this respect.

Operation 316 may space-time encode the symbol-modulated subcarriers for each spatial data stream for subsequent transmission by transmit antennas 120 (FIG. 1). This may allow an equal or greater number of transmit antennas to be used to transmit the number of spatial data streams. Operation 316 may be performed by STC encoder 116 (FIG. 1), although the scope of the invention is not limited in this respect.

Although the individual operations of procedure 300 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the invention may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier transmitter comprising:
an encoded bit puncturer to remove bits from an encoded bit stream to reserve space for pilot subcarriers;
an interleaver to interleave blocks of bits provided by the encoded bit puncturer and to generate blocks of interleaved bits;
a pilot subcarrier bit puncturer to selectively remove additional bits from the blocks of interleaved bits to achieve equal spacing between the bits removed by the encoded bit puncturer; and
a symbol mapper to map groups of bits received from the pilot subcarrier bit puncturer to data symbols of subcarriers of a multicarrier communication signal and to refrain from mapping groups of bits to pilot subcarriers of the multicarrier communication signal.

2. The transmitter of claim 1 wherein the encoded bit puncturer removes the bits from the encoded bit stream to reserve space for pilot subcarriers for a predetermined number of transmit antennas.

3. The transmitter of claim 2 wherein the pilot subcarrier bit puncturer selectively removes the additional bits from the blocks of interleaved bits to reserve space for pilot subcarriers of additional transmit antennas and refrains from removing bits from the blocks of interleaved bits for pilot subcarriers when the predetermined number of transmit antennas are used.

4. The transmitter of claim 2 further comprising a bit encoder to add forward-error correcting code bits to an input bit stream to generate an encoded bit stream,
wherein the encoded bit puncturer is to puncture bits of the encoded bit stream to achieve a target code rate, the target code rate being selected to reserve space for pilot subcarriers for the predetermined number of transmit antennas.

5. The transmitter of claim 2 further comprising a bit position calculator to calculate bit position indices of bits to be removed by the bit puncturer based on a number of additional pilot subcarriers for transmission on more than the predetermined number of transmit antennas.

6. The transmitter of claim 2 wherein the pilot subcarrier bit puncturer selectively removes bits based on bit position indices stored at the transmitter, the bit position indices being pre-calculated based on a number of additional pilot subcarriers for transmission on more than the predetermined number of transmit antennas.

7. A multicarrier transmitter comprising:
an encoded bit puncturer to remove bits from an encoded bit stream to reserve space for pilot subcarriers for a predetermined number of transmit antennas;
an interleaver to interleave blocks of bits provided by the encoded bit puncturer and generate the blocks of interleaved bits;
a pilot subcarrier bit puncturer to selectively remove additional bits from the blocks of interleaved bits to achieve equal spacing between the bits removed by the encoded bit puncturer;
a symbol mapper to map groups of bits received from the pilot subcarrier bit puncturer to data symbols of subcarriers of a multicarrier communication signal and to refrain from mapping groups of bits to pilot subcarriers of the multicarrier communication signal; and
a bit marker to mark bits of the encoded blocks of bits in a uniform manner prior to interleaving,
wherein the pilot subcarrier bit puncturer comprises a bit extractor to remove the marked bits after interleaving.

8. The transmitter of claim 7 wherein the bit extractor removes the marked bits after interleaving based on position indices generated from the marked bits.

9. A multicarrier transmitter comprising:
an encoded bit puncturer to remove bits from an encoded bit stream to reserve space for pilot subcarriers for a predetermined number of transmit antennas;
an interleaver to interleave blocks of bits provided by the encoded bit puncturer and to generate blocks of interleaved bits;
a pilot subcarrier bit puncturer to selectively remove additional bits from the blocks of interleaved bits to achieve equal spacing between the bits removed by the encoded bit puncturer; and
a symbol mapper to map groups of bits received from the pilot subcarrier bit puncturer to data symbols of subcarriers of a multicarrier communication signal and to refrain from mapping groups of bits to pilot subcarriers of the multicarrier communication signal,
wherein the transmitter selectively transmits up to three or more spatial data streams with up to three or more transmit antennas,
wherein the transmitter includes an interleaver, a pilot subcarrier bit puncturer and a symbol mapper for each spatial data stream, and
wherein the transmitter further comprises a bit distributor to distribute coded bits to the interleavers for each of the spatial data streams.

10. The transmitter of claim 9 wherein the encoded bit puncturer uniformly removes bits from the encoded bit stream to reserve space for pilot subcarriers for two of the transmit antennas,
wherein the pilot subcarrier bit puncturers selectively remove bits from the blocks of interleaved bits to reserve space for pilot subcarriers for a third transmit antenna and any additional transmit antenna when more than the two transmit antennas are used,
wherein the pilot subcarrier bit puncturers refrain from removing bits from the blocks of interleaved bits when only the two transmit antennas are used.

11. The multicarrier transmitter of claim 10 further comprising a space-time code (STC) encoder to space-time encode the data symbols provided by the symbol mapper for each spatial data stream when a number of the spatial data streams differs from a number of the transmit antennas.

12. The transmitter of claim 11 further comprising a beamformer to apply beamforming weights to frequency domain symbol modulated subcarriers provided by the STC encoder prior to performing an inverse Fourier-transform.

13. The transmitter of claim 12 further comprising inverse Fourier-transform circuitry for each transmit antenna to generate time-domain signals from the data symbols and pilot symbols for transmission by one or more of the transmit antennas, wherein the transmit antennas transmit orthogonal frequency division multiplexed signals on a plurality of subcarriers, and wherein each transmit antenna transmits on the same subcarriers employing spatial diversity.

14. The transmitter of claim 2 wherein the pilot subcarrier bit puncturer is one of a plurality of pilot subcarrier bit puncturers to selectively remove additional bits from blocks of interleaved bits to reserve space for pilot subcarriers for additional transmit antennas when more than the predetermined number of transmit antennas are used for transmitting.

15. The transmitter of claim 14 further comprising a system controller to determine a number of transmit antennas to use for transmitting and to configure the pilot subcarrier bit puncturers to selectively remove the additional bits when more than the predetermined number of transmit antennas are used for transmitting, wherein the pilot subcarrier bit puncturers selectively remove the additional bits from the blocks of interleaved bits to achieve equal spacing between bits that were removed by the encoded bit puncturer.

16. The transmitter of claim 15 wherein each of the pilot subcarrier bit puncturers is associated with one of a plurality of spatial data streams, and wherein the transmitter further comprises symbol mappers for each spatial data stream to map groups of bits received from the pilot subcarrier bit puncturers to data symbols of subcarriers of a multicarrier communication signal and to refrain from mapping groups of bits to pilot subcarriers of the multicarrier communication signal.

17. The transmitter of claim 16 further comprising a space-time code encoder to space-time encode the spatial data streams to the transmit antennas allowing a lesser number of spatial data streams to be transmitted on an equal or greater number of transmit antennas.

18. The transmitter of claim 15 further comprising a bit position calculator to calculate bit position indices of bits to be removed by each of the bit puncturers based on a number of additional pilot subcarriers for transmission on more than the predetermined number of transmit antennas.

19. A method performed by a multicarrier transmitter for transmitting a multicarrier communication signal, the method comprising:

removing bits from an encoded bit stream to reserve space for pilot subcarriers for a predetermined number of transmit antennas of a plurality of transmit antennas;

interleaving blocks of bits after removal of bits from the encoded bit stream to generate blocks of interleaved bits;

selectively removing additional bits from the blocks of interleaved bits to reserve space for pilot subcarriers for additional transmit antennas when more than the predetermined number of transmit antennas is used for transmitting; and wherein selectively removing additional bits comprises selectively removing the additional bits to achieve equal spacing between bits that were removed from the encoded bit stream of the blocks prior to interleaving;

mapping groups of bits after the additional bits are removed to data symbols of subcarriers of the multicarrier communication signal.

20. The method of claim 19 further comprising:

refraining from mapping groups of bits after the additional bits are removed to pilot subcarriers of the multicarrier communication signal.

21. A method performed by a multicarrier transmitter for transmitting a multicarrier communication signal, the method comprising:

removing bits from an encoded bit stream to reserve space for pilot subcarriers for a predetermined number of transmit antennas of a plurality of transmit antennas;

distributing encoded bits to each of a plurality of spatial data streams after uniformly removing bits from the encoded bit stream;

interleaving blocks of bits after removal of bits from the encoded bit stream to generate blocks of interleaved bits; and selectively removing additional bits from the blocks of interleaved bits to reserve space for pilot subcarriers for additional transmit antennas when more than the predetermined number of transmit antennas is used for transmitting, the additional bits being removed to achieve equal spacing between bits that were removed from the encoded bit stream;

mapping groups of bits after the additional bits are removed to data symbols of subcarriers of the multicarrier communication signal;

refraining from mapping groups of bits after the additional bits are removed to pilot subcarriers of the multicarrier communication signal; and space-time encoding the spatial data streams to allow a lesser number of spatial data streams to be transmitted on an equal or greater number of transmit antennas, wherein the selectively removing additional bits, the mapping and the refraining is performed for each of the plurality of spatial data streams.

22. The method of claim 19 further comprising calculating bit position indices of the additional bits to be selectively removed based on a number of additional pilot subcarriers for transmission on more than the predetermined number of transmit antennas.

* * * * *